(12) United States Patent
Chilukuri

(10) Patent No.: US 12,008,531 B2
(45) Date of Patent: Jun. 11, 2024

(54) METHODS AND SYSTEMS OF A MULTISTAGE OBJECT DETECTION AND TRACKING CHECKOUT SYSTEM

(71) Applicant: Surya Chilukuri, Cupertino, CA (US)

(72) Inventor: Surya Chilukuri, Cupertino, CA (US)

( * ) Notice: Subject to any disclaimer, the term of this patent is extended or adjusted under 35 U.S.C. 154(b) by 334 days.

(21) Appl. No.: 17/372,845

(22) Filed: Jul. 12, 2021

(65) Prior Publication Data
US 2022/0019988 A1   Jan. 20, 2022

Related U.S. Application Data

(60) Provisional application No. 63/053,155, filed on Jul. 17, 2020.

(51) Int. Cl.
| | |
|---|---|
| *G06Q 20/18* | (2012.01) |
| *G06N 20/00* | (2019.01) |
| *G06Q 20/20* | (2012.01) |
| *G06V 20/40* | (2022.01) |
| *G06V 20/52* | (2022.01) |
| *G06V 40/20* | (2022.01) |
| *G07G 3/00* | (2006.01) |
| *H04N 23/90* | (2023.01) |
| *G06Q 30/0601* | (2023.01) |
| *G06V 10/25* | (2022.01) |
| *G06V 10/764* | (2022.01) |

(52) U.S. Cl.
CPC ............. *G06Q 20/18* (2013.01); *G06N 20/00* (2019.01); *G06Q 20/208* (2013.01); *G06V 20/40* (2022.01); *G06V 20/52* (2022.01); *G06V 40/20* (2022.01); *G07G 3/003* (2013.01); *H04N 23/90* (2023.01); *G06Q 30/0633* (2013.01); *G06V 10/25* (2022.01)

(58) Field of Classification Search
CPC .. G06Q 20/18; G06Q 20/208; G06Q 30/0633; G06Q 20/203; G06Q 20/204; G06Q 20/32; G06N 20/00; G06N 3/045; G06N 3/08; G06V 20/40; G06V 20/52; G06V 40/20; G06V 10/25; G07G 3/003; G07G 1/0045; H04N 23/90; H04N 23/61; H04N 23/80
USPC ........................................................ 705/23
See application file for complete search history.

(56) References Cited

U.S. PATENT DOCUMENTS

| | | | |
|---|---|---|---|
| 10,990,923 B1 * | 4/2021 | Niranjayan | ............... G06T 7/20 |
| 11,481,751 B1 * | 10/2022 | Chaubard | ............... G06V 10/82 |
| 2020/0005613 A1 * | 1/2020 | Yuan | ...................... G06V 40/10 |

(Continued)

*Primary Examiner* — Garcia Ade

(57) ABSTRACT

A system for multistage object detection and tracking for realizing a cashierless checkout includes a mobile device. The mobile device includes a set of on-board sensors together installed to the shopping container. The on-board sensors could include multiple digital cameras viewing interior of the shopping container from different angles and positions. The on-board sensors detect and provide user activity data with respect to placement or removal of the items into or from the shopping container. The digital camera obtains a set of digital image frames associated with the unique signatures associated with various shopping items entering and leaving the interior region of the shopping container and communicates them to a mobile device comprising an on-device machine learning (ML) detection and tracking engine; and relay them to subsequent stages for improved accuracy and confidence to arrive at a go/no-go decision.

12 Claims, 15 Drawing Sheets

(56) References Cited

U.S. PATENT DOCUMENTS

| | | | | |
|---|---|---|---|---|
| 2020/0074432 A1* | 3/2020 | Valdman | ............... | G07G 5/00 |
| 2020/0334834 A1* | 10/2020 | Fisher | ............... | G06V 10/764 |
| 2021/0042528 A1* | 2/2021 | Kundy | ............... | G07G 1/0054 |
| 2021/0101253 A1* | 4/2021 | Hoshikawa | ......... | G06K 19/0723 |
| 2021/0342805 A1* | 11/2021 | Geiger | ............... | H04N 23/61 |

* cited by examiner

| Anomaly Detection Scenarios |
| --- |
| Scan item A and put it into the cart, later swap item A with item B without scanning item B |
| Scan item A with one hand, put item B into the cart instead of item A |
| Scan item A with one hand, put item B into the cart at the same time as item A |
| Scan item A with one hand while blocking item B from view, place both items into the cart |

| Occlusion Scenarios |
| --- |
| Large item placed blocking camera view for extended periods of time |
| Camera view blocked repeatedly by hand / palm movements / gestures |
| Camera view blocked repeatedly by moving unrelated / unrecognizable items |
| Camera view blocked permanently by chewing gum or something else |

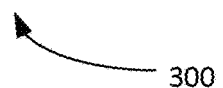

FIGURE 3

METHODS AND SYSTEMS OF A MULTISTAGE OBJECT DETECTION AND TRACKING CHECKOUT SYSTEM

CLAIM OF PRIORITY

This application claims priority to U.S. Provisional Patent Application No. 63/053,155, titled METHODS AND SYSTEMS OF MULTISTAGE OBJECT DETECTION AND TRACKING CHECKOUT SYSTEM, and filed on 17 Jul. 2020. This provisional patent application is incorporated by reference in its entirety.

BACKGROUND

Automated checkout systems can be used to enable cashierless checkout in a retail environment, which can have significant impact on customer engagement and operational efficiency. In this way, the primary advantage of such systems being shortened checkout lines and/or in some cases they could be even eliminated fully. However, these self-checkout systems have to be secure, engaging, efficient, with fast turnaround time to reduce dependency on cashiers. Further, these self-checkout mechanisms can vastly improve store employees' productivity where they can be freed up for customer service-related activities. Accordingly, improvements to self-checkout mechanisms are needed to further reduce operational costs and enhance the customer in-store experience.

SUMMARY OF THE INVENTION

A multistage object detection and tracking system and method has been outlined for realizing a cashierless checkout system. The proposed system is based on a mobile device which includes a set of on-board sensors together with other electronic subsystems could be installed to a shopping container. The on-board sensors include digital cameras and/or time of flight imaging sensors for viewing the interior of the shopping container. The on-board sensors detect and provide user activity data with respect to the placement or removal of the shopping items into or from the shopping container. Multiple digital cameras capture digital image frames from various angles and positions of various shopping items entering or leaving the interior region of the shopping container and communicates these frames to the mobile device comprising an on-device ML detection and tracking engine. The on-device ML detection and tracking engine uses computer vision and specified ML algorithms to implement object detection and tracking to detect items with their unique signatures going in and out of the shopping container and determines the state of the item in the interior region of the shopping container. Then the mobile device transmits these digital camera frames to a remote stage two to execute a different set of ML detection and tracking algorithms to determine the state of the items in the interior region of the shopping container. The second stage can be replicated into multiple stages till the desired accuracy is achieved to realize a robust cashierless checkout system. All the results from different stages are relayed to a third stage which executes correlation algorithms to determine go/no-go decision for a given shopper.

BRIEF DESCRIPTION OF THE DRAWINGS

FIG. 3 illustrates an example set of anomaly and occlusion detection scenarios implemented, according to some embodiments.

Figure 1:
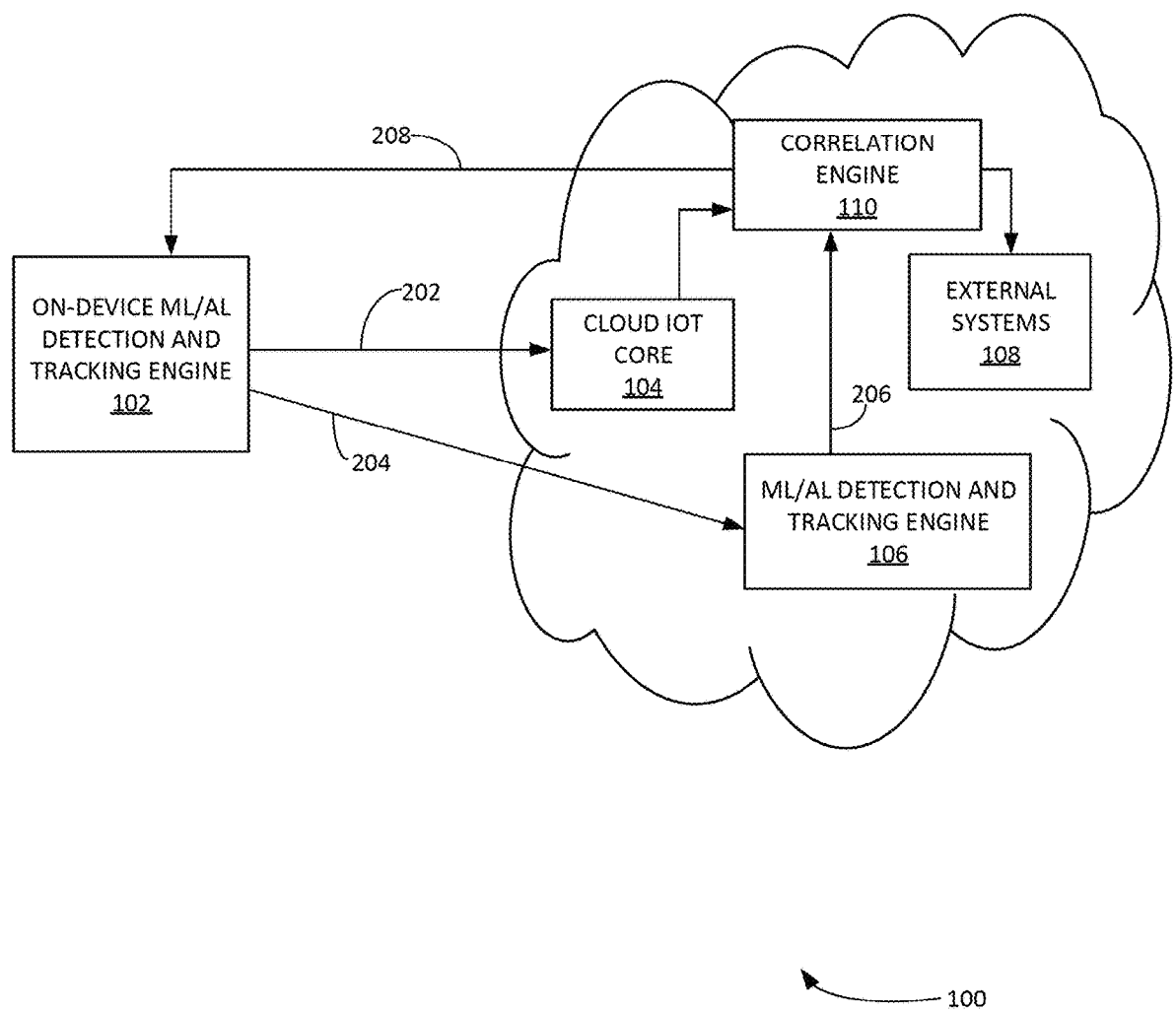
FIG. 1 illustrates an example system for multistage object detection and tracking checkout, according to some embodiments.

The Figures described above are a representative set and are not exhaustive with respect to embodying the invention.

DESCRIPTION

Disclosed are a system, method, and article of manufacture for multistage object detection and tracking checkout in a retail environment. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Anomaly detection is the identification of unknown items, unexpected events or suspicious activities that are different from the majority of the data.

Bounding box is a rectangular box that can be determined by the x and y axis coordinates in the upper-left corner and the x and y axis coordinates in the lower-right corner of the rectangle.

Computer vision includes methods for acquiring, processing, analyzing, and understanding digital images. Computer vision methods can extract high-dimensional data from the real world in order to produce numerical or symbolic information (e.g. in the forms of decisions).

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Personal shopping assistant (PSA) can be a mobile handheld device (e.g. a smartphone, etc.), a separate electronic device with sensors and multiple cameras that could be fixed to a shopping container, a standalone data terminal etc. and/or a combination thereof that could aid in the process of shopping.

Product code can be a unique identifier, assigned to each finished/manufactured product which is ready, to be marketed or for sale.

Region of interest (ROI) is a portion of an image that a computing functionality is to filter and/or operate on in some way.

Shopping container can be a shopping cart or a shopping basket that hold shopping items.

Time-of-flight Sensor (ToF) is a range imaging sensor that employs time-of-flight techniques to resolve distance between the camera and the subject for each point of the image, by measuring the round-trip time of an artificial light signal provided by a laser and/or an LED. A ToF sensor not only serves as a motion detection system, but also as a depth-perception device (3D) of items and user gestures.

Example Embodiment

An example of a multi-stage object detection, tracking and accounting method and a system is disclosed in various embodiments. The multi-stage object detection, tracking and accounting method provides for a mechanism to realize a cashierless checkout system in a retail environment (e.g. supermarkets, corner stores, specialty stores etc.).

Shopping activity can start with a user engaging a mobile device at an entrance of a store. Once the mobile device completes initial checks, a virtual shopping session is created specific to the user to track all shopping actions such as scanning the items, placing them into the shopping cart or taking them out of the cart or even just doing a price check where the item is simply put back on the shelf. All these user actions can be detected, tracked, and accounted before ascertaining if the shopper can checkout. The outlined invention leverages several on-board devices such as cameras, sensors, displays on the mobile device at various stages of shopping activity to accomplish these tasks.

The first shopping activity can start with the shopper taking an item off a shelf and scanning the barcode or unique product code with the help of the product reader. A product reader can be realized either through an on-board scanner and/or with a set of digital cameras and a product code decoding software application. Once an item is scanned, the shopper proceeds either by placing the item into the cart or simply placing it back on the shelf. The system proceeds to record the product code in the virtual shopping session as one of the shopping actions. Example systems and processes for implementing a shopping activity are now discussed.

Example Systems and Processes

FIG. 1 illustrates an example multistage object detection and tracking checkout system 100, according to some embodiments. Multistage object detection and tracking checkout system 100 can implement a multi-stage method in object detection, tracking and/or accounting of a user's actions. Multistage object detection and tracking checkout system 100 can ascertain if the shopper is ready for checkout or not. It is noted that checkout is a process where the system goes through a series of steps to verify and validate if the shopper is good for final payment and completing the checkout process. Multistage object detection and tracking checkout system 100 helps in realizing a cashierless checkout method that obviates the need to go through manual checkout lines in a store.

As discussed further infra, multistage object detection and tracking checkout system 100 implement cashierless checkout in three or more stages. Stage 1 uses mobile devices (e.g. Smartphones, Personal Shopping Assistant (PSA) devices, Data Terminals, Mobile Devices, etc.) as an interface to users to engage in a retail shopping experience. During stage 1, various onboard peripheral devices are used to collect and process events associated with user shopping activities. Example onboard peripheral devices can include, inter alia:

such as product reader, sensors (could be optical or infrared), cameras, display, etc. Stage 2 includes various video streaming and/or the transmission of sensor data from Stage 1 systems and applications to remote servers. The remotes servers can be either on premises (e.g. within the retail store) and/or in a cloud-computing platform for further processing. Stage 3 reconciles and implements an accounting of the data from stage 1 and stage 2 to determine if the shopper is ready for checkout. This information can be used to then signal the readiness to various entities such as, inter alia: the user (e.g. the shopper), the retail entity, e-commerce and/or other entities used to implement the cashierless transactions, law enforcement, etc.

More specifically, multistage object detection and tracking checkout system 100 can include on-device ML/AI detection and tracking engine 102. On-device ML/AI detection and tracking engine 102. On-device ML/AI detection tracking engine 102 can interface with various on-board sensors (e.g. in a shopping cart, shopping basket, etc.). On-board sensors provide a source to detect and provide data for user activity. Example on-board sensors can be specialty time of flight (ToF) motion sensors, gyroscope, accelerometer, magnetometer, temperature sensor, multiple digital cameras, etc. ToF sensors detect motion in around the cart by sending optical signals out and capturing reflected signals. These reflected signals will be out of phase when compared with the original signals, which helps in determining the distance of incident very accurately. Multistage object detection and tracking checkout system 100 can use pre-measured lengths within the system to determine if the incident happened within the shopping cart or outside the cart. The accelerometer can be used to measure changes in the velocity and changes in position of the PSA (and/or that of the shopping cart). The magnetometer can be used as a compass to determine PSA orientation (and that of the shopping cart) in the North, South, East and West plan. The gyroscope can be used for measuring changes in rotational velocity of the PSA (and/or that of the shopping cart). The image sensory data can be used in various ways to ascertain shopping activities from different perspectives to improve overall accuracy or the confidence factor of the proposed solution. The sensor data from the on-board device (e.g. PSA) is streamed to the cloud-computing platform via various computer networks (e.g. via wireless communication, the Internet, cellular/data networks, etc.) for further processing (e.g. as described infra).

On-board sensors can further include multiple digital cameras. These cameras could be part of the mobile device and/or installed at various any angles and positions within the interior of the shopping container to capture the video frames of various shopping items entering and leaving it. The video frames provide unique signatures (features) of the shopping items in terms of product code, dimensions, the coordinates of the shopping items relative to the shopping container, direction of the movement if the item is entering or leaving the shopping container. Using these digital camera video feeds, the mobile device can implement on-board computer vision algorithms, various object detection and tracking methods with respect to isolating and detecting the unique signatures of the items going in or out of the shopping container and the direction of the item movement. This can be performed on the mobile device even before the digital video (e.g. also obtained by on-board sensors) is streamed to a remote location for further processing.

On-device AI/ML Engine 102 does item detection and tracking of items and their signatures going in and out of the cart. On-device AI/ML Engine 102 can implement object detection (e.g. using on-board sensor data such as digital camera data). In one example, object detection can include two phases. In a first phase, camera frames are scanned for semantic changes from previous frames. During a subsequent inference phase actual object detection of the unique signatures and the direction takes place. These phases can be repeated as needed.

It is noted that since the digital camera is capable of capturing video frames at a high speed, the number of frames to be processed may be at a higher rate than can be handled by the edge on-board computing device (e.g. the PSA, smartphones, data terminals, etc.) using on-device ML/AI detection and tracking engine 102. Accordingly, multistage object detection and tracking checkout system 100 can utilize an adaptive frame-skipping logic. The adaptive frame-skipping logic can scan for major changes from previous frames and then feeds this to an inference engine for object detection. This approach improves the on-board compute resource utilization so it can deliver better user experience.

Item detection logic further can include adding different regions of interest (ROI) within the shopping container. This helps in localizing specific areas of the shopping items such as the product code for the computer vision algorithms to focus. The first ROI-1 is defined all across at the top the length and breadth of the shopping container. A second ROI-2 has been added to monitor the base of the cart. And a third ROI-3 is defined for detecting activity at the top of the cart, where we have the handlebar.

ROI-1 can be the primary area of interest where multistage object detection and tracking checkout system 100 can ascertain the shopping item unique signatures and direction of the item movement. This can be either from outside to inside of the shopping cart or vise-versa (e.g. when a shopper pulls an item of the cart and returns to the shelf). It can be the case when the item is either placed into the cart or taken out (e.g. a price check when the shopper simply wishes to check an item price and may return to the shelf, etc.). ROI-1 can be defined for each of the digital cameras installed on the shopping container, which provides a unique view of the shopping item and its unique signatures along with the direction of movement. Furthermore, in order to eliminate false positives or false negatives, an upper and lower thresholds can be defined for each ROI-1. Multistage object detection and tracking checkout system 100 can flag a direction event only when the item clears both the thresholds.

It is noted that there may be cases where the shopper can drop an item at high speed into the cart and/or try to hide the unique signatures such as product code that identifies an item. This incident can be accidental and/or it can be on purpose to cheat the system. This random act of dropping items may not be captured by the digital cameras during ROI-1 transition. However, such an event is significantly minimized by using multiple cameras which are positioned at various angles and positions of the shopping container. To handle these types of edge cases, ROI-2 comes into play. In ROI-2, various computer algorithms track the items that hit the bottom of the cart. When there is a change in the item count without corresponding events from any of the ROI-1s and/or product scanner, the system flags the user that an unscanned item has been added into the cart and it should be rectified. When the user doesn't take a corrective action by taking the item out of the shopping container, the on-board device can alert by flashing continuously until the issue is resolved. However, when no error is detected a unique tracker identification number will be assigned to the shopping item that got placed into the shopping container. The unique tracker identification is used in tracking the item as it could move within the cart and/or when the user removes it from the cart and returns it to a shelf without scanning it.

ROI-3 can detect when items being placed in the area near the handlebar, which will not be a valid shopping action and shopper can be alerted to remove the item, scan it, and place it within the main cart area or simply remove it from that area.

On-device ML/AI detection and tracking engine 102 in the on-board device (e.g. a PSA) can process these events in real-time (e.g. assuming networking and processing latency) as a first pass in categorizing the shopping activities happening in the shopping cart. On-device ML/AI detection and tracking engine 102 can use the networking systems of the on-board device to forward its findings along with the events and the video stream via wireless connection to the next stage for further processing.

Multistage object detection and tracking checkout system 100 can implement stage 2 in a cloud-computing platform and/or other remote servers. In stage 2, on-device ML/AI detection and tracking engine 102 can communicate with a remote AI/ML detection and tracking Engine 106. Remote AI/ML detection and tracking Engine 106 can be coupled with several powerful compute resources than available with the edge devices (e.g. PSA, etc.). These can include correlation engine 110, cloud IOT core 104, external systems 108, etc. These can be implemented in a cloud-computing platform.

These stage 2 servers can implement a different set of advanced computer vision algorithms and provide secondary result sets. For example, several post image processing software solutions are used for improved object detection at this stage. In addition, stage 2 searches for anomalies such as, inter alia: the act of swapping items, blocking the view of the camera with larger items (e.g. occlusion) etc. Example occlusion scenarios can include, inter alia: a large item placed blocking camera view for extended periods of time such that the camera view is blocked repeatedly by the hand; palm movements the occlude the camera view; gestures that block the camera view blocked repeatedly; unrecognizable items that block the camera view; a permanently blocked camera view with some sticky substance, etc.

It is further noted, stage 2 uses a different set of ML algorithms. These ML algorithms can be more computationally intensive and require more compute power and/or resources. This way, stage 2 can provide a different perspective from stage 1. For example, stage 2 can be used for analysis of anomalies, occlusion etc. Stage 2 can be used to refine the findings from stage 1. In this way, stage 2 can help in delivering a more robust cashierless checkout system. If required stage 2 instances can be replicated until a specific/desired accuracy/error reduction is achieved.

Multistage object detection and tracking checkout system 100 can implement stage 3. In stage 3, specified remote servers can receive continuous streams of data from stage 1 and stage 2. In stage 3, multistage object detection and tracking checkout system 100 can use the correlation engine 110 to validate and ratify shopping activities for appropriateness (e.g. see the state machine spreadsheet of FIGS. 5 A-D on how it ascertains each activity). At the end of the shopping session can be determined by a user generated event. For example, the trigger can be a specified user action such as a checkout signal from the shopper's smartphone. Then the Stage 3 can collate and communicate all the user transactions along with a go/no-go checkout decision to the external systems for further processing.

Multistage object detection and tracking checkout system 100 can handle occlusion events. An occlusion event can occur when an item is completely hidden behind another item with respect to a digital camera. For example, state machine 500 can track state information for occluded items (e.g. see infra). Multistage object detection and tracking checkout system 100 can use state machine 500 to capture user intents as well. In this way, multistage object detection and tracking checkout system 100 can determine if a user is not intentionally committing fraud when an item tracking error occurs. Based on user intents, multistage object detection and tracking checkout system 100 can make a 'go/no-go' decision with respect to the validity of a checkout.

Example Methods

Figure 2:
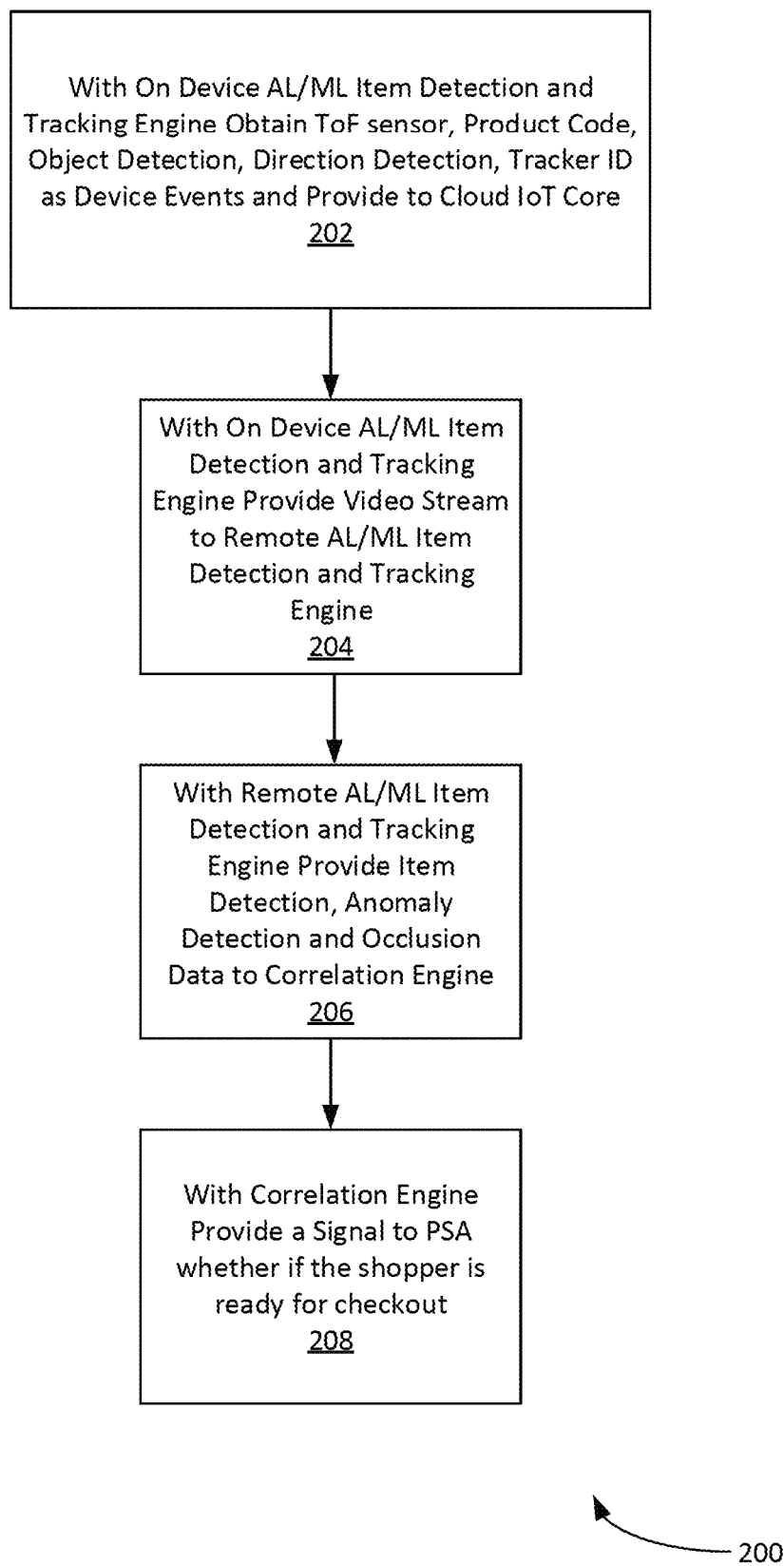
FIG. 2 illustrates an example process for multistage object detection and tracking checkout, according to some embodiments.

FIG. 2 illustrates an example process 200 for multistage object detection and tracking checkout, according to some embodiments. Process 200 can be implemented by multistage object detection and tracking checkout system 100. In step 202, process 200 can with on device AI/ML item detection and tracking engine obtain ToF sensor, product code, object detection, direction detection, tracker identifier as device events and provide a cloud IoT core. In step 204, with the on-device AL/ML item detection and tracking engine, process 200 can provide video stream to the remote AL/ML item detection and tracking engine. In step 206, with a remote AL/ML item detection and tracking engine, process 200 can provide item detection, anomaly detection and occlusion data to the correlation engine. In step 208, with correlation engine, process 200 can provide a signal to the mobile device as to whether the shopper is ready for checkout or not.

FIG. 3 illustrates an example set of anomaly and occlusion detection scenarios 300 implemented by stage 2, according to some embodiments. The detected anomalies and occlusions are forwarded as events to Stage 3 for further processing in making a go/no-go decision.

Figure 4:
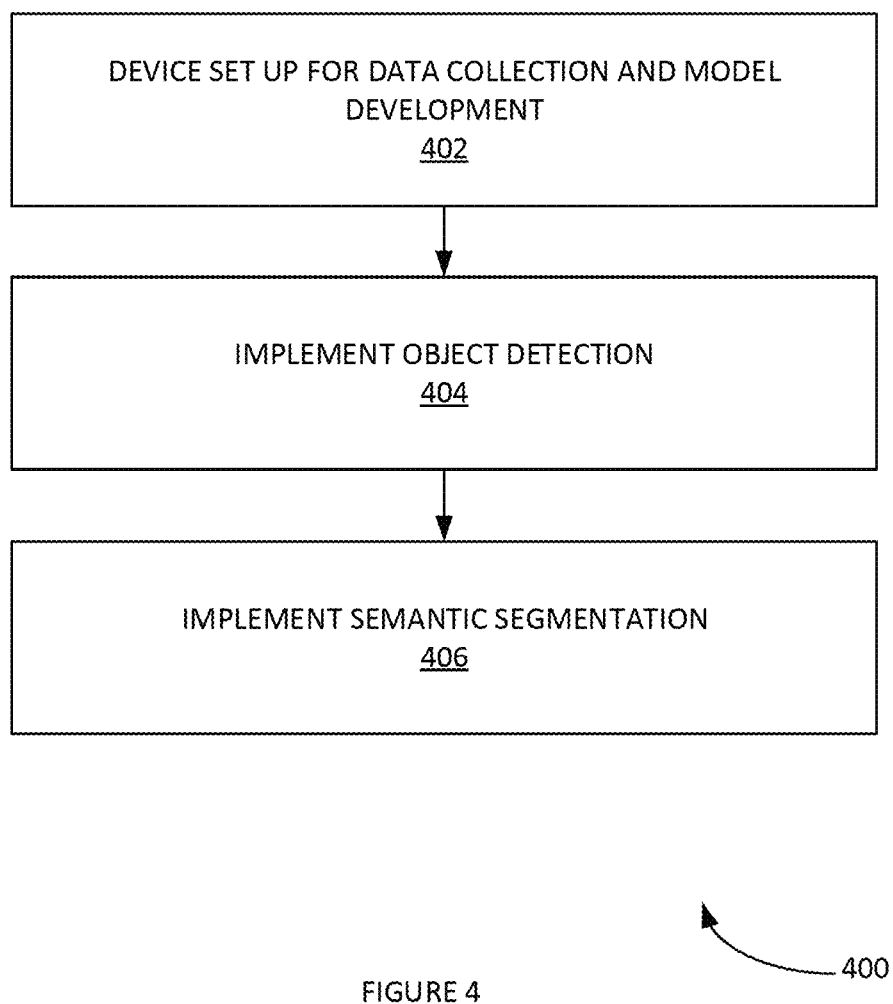
FIG. 4 illustrates an example process for multistage object detection and tracking checkout systems, according to some embodiments.
Figure 5A:
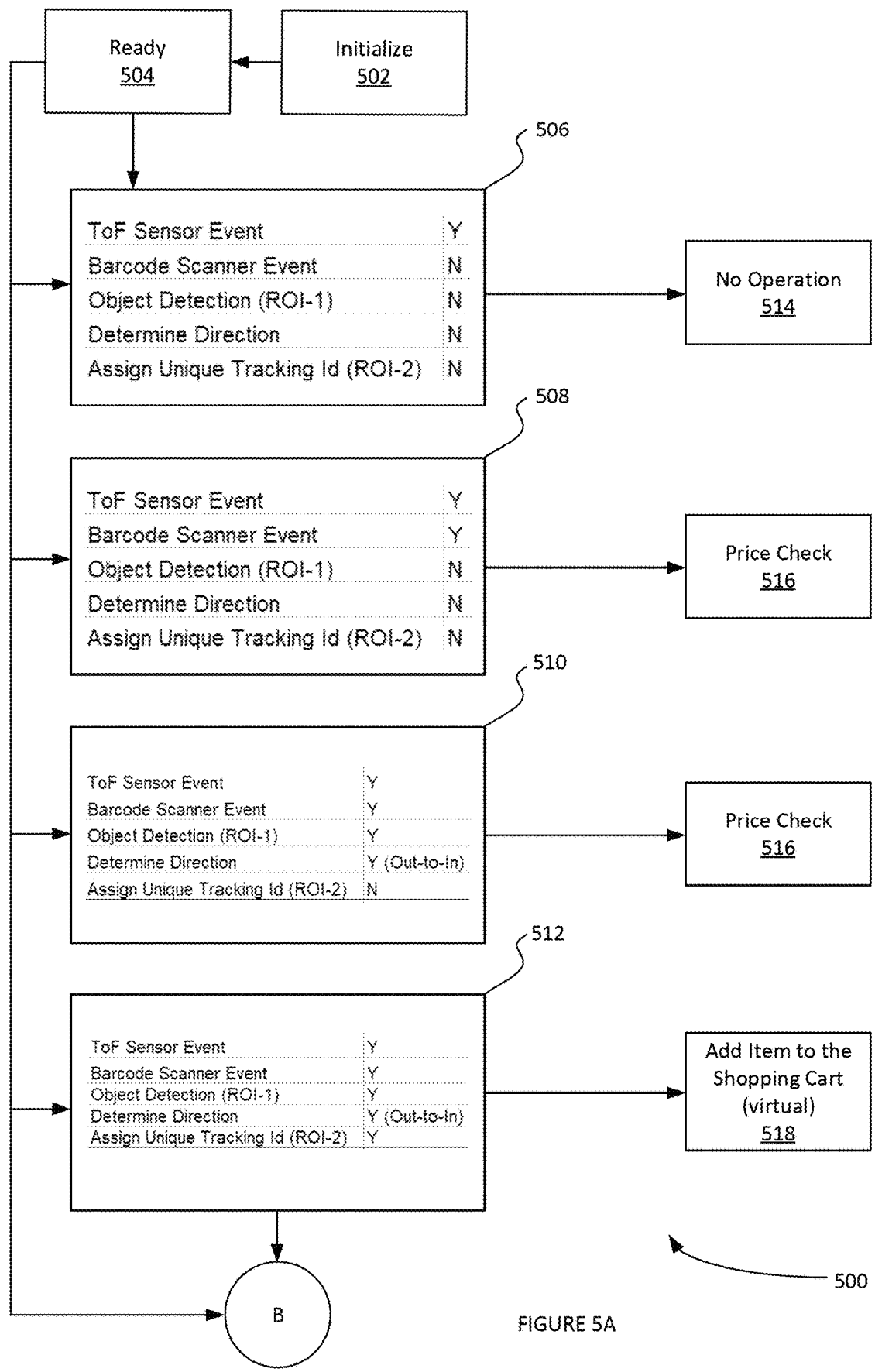
FIGS. 5 A-D illustrates an example state machine for implementing a state of items/products, according to some embodiments.
Figure 5B:
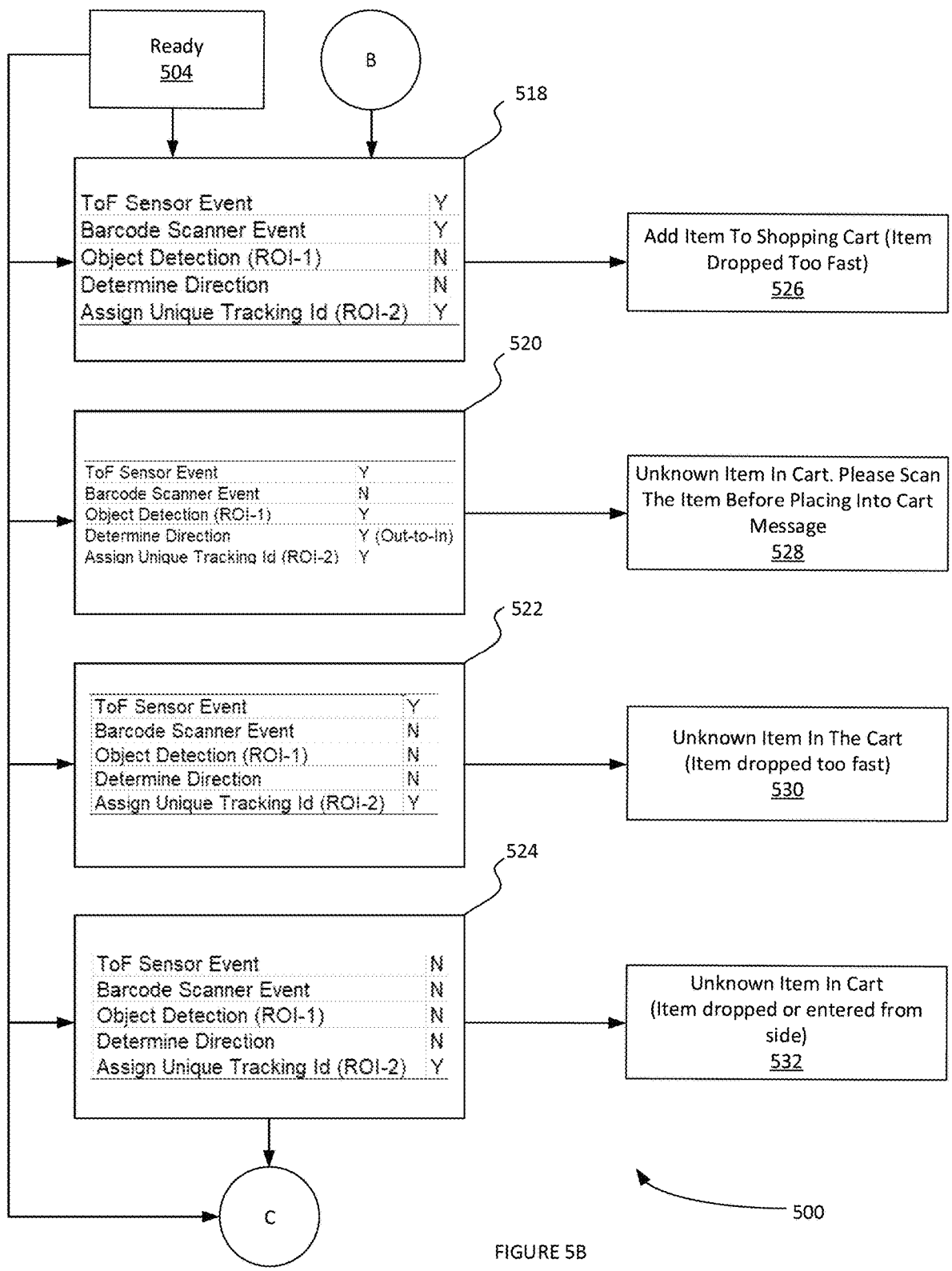
Figure 5C:
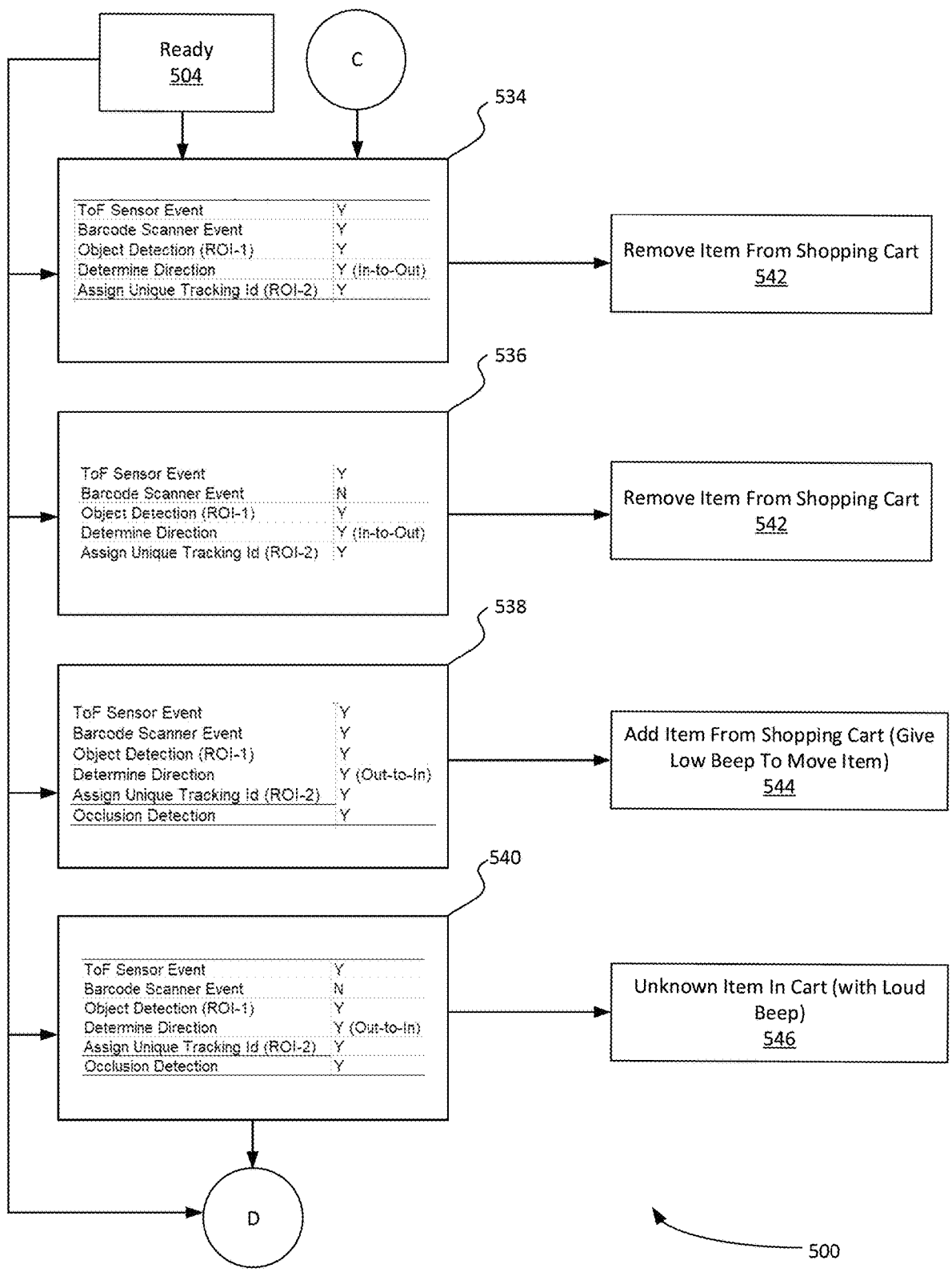
Figure 5D:
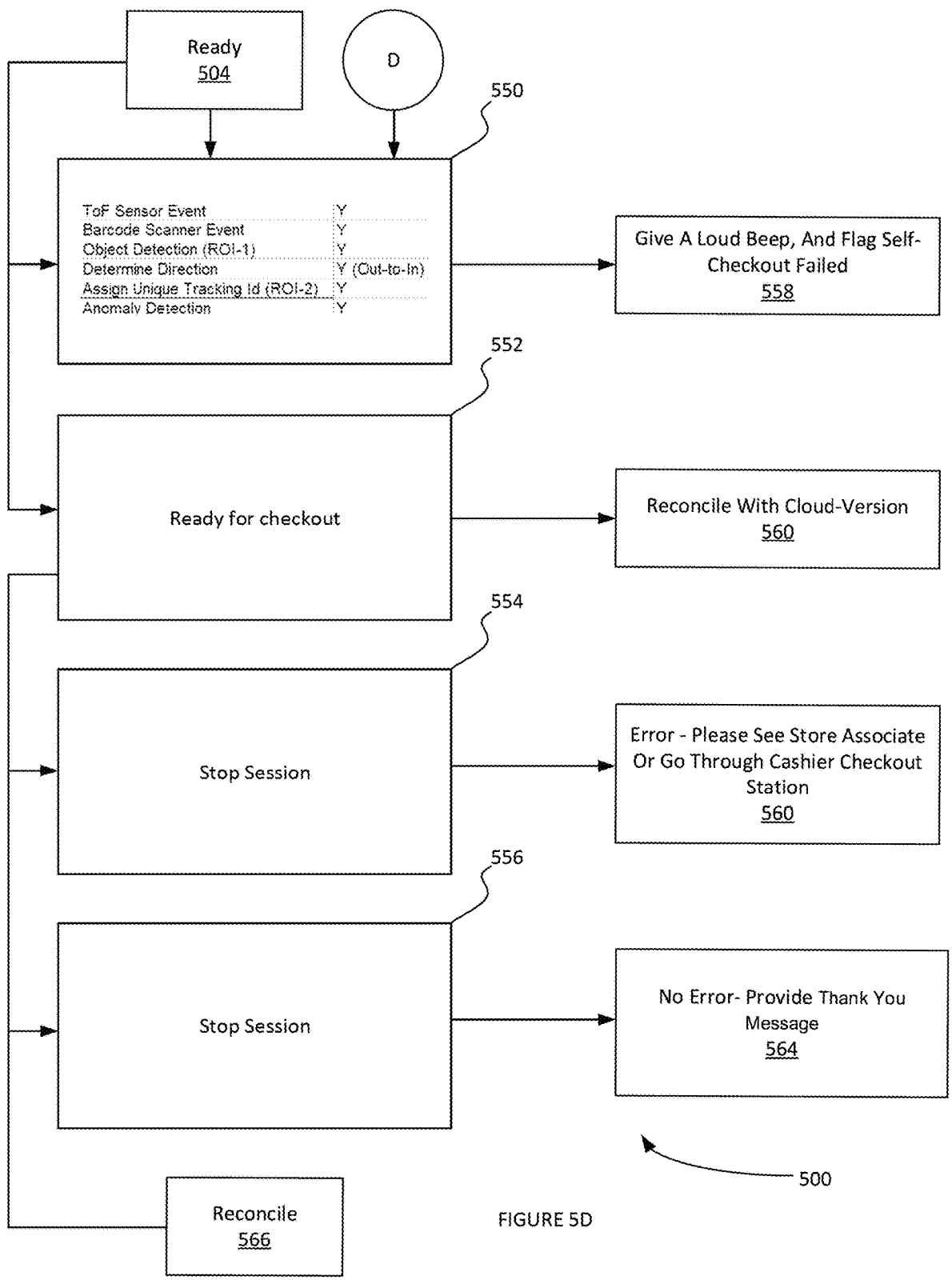

FIG. 4 illustrates an example process 400 for the multistage object detection and tracking checkout system, according to some embodiments. In step 402, the device is set up for data collection and model development. FIG. 5 illustrates an example set of images 500 of device set up in a shopping cart, according to some embodiments.

In step 404, process 400 can implement object detection. In one example, MobileNetSSD can be used as a box class classifier. Process 400 can be trained to ignore boxes of no interest and in the background.

In step 406, process 400 can implement semantic segmentation. In some examples, various segmentation models (e.g. ESPNet, UNet, DeepLab v3, Mask RCNN etc.) can be used. The semantic segmentation model (e.g. the ESPNet model) can be optimized for the underlying CPU/GPU for improved performance.

FIGS. 5 A-D illustrates an example state machine for implementing a state of items/products, according to some embodiments. State machine 500 can have a current state (e.g. ready state 504). State machine 500 can then receive/determine an event (e.g. 506-512, 518-524, 534-540, 550-556, etc.). An event can be an external trigger. When a specified permutation of events are determined to have occurred, state machine 500 can move into a new state. This new state can be a transaction (e.g. 514-518, 526-532, 542-546, and 558-564).

In one example, state machine 500 can, in step 502, initialize and be set in a ready state 504. The state machine 500 can determine a set of events to trigger state changes.

These are provided in steps 506-512, 518-524, 534-540, 550-556. Each event determines if a condition is in a yes (Y) or no (N) state. Example events are provided herein by way of example and not of limitation. However, it is noted that in other examples, other events can be implemented. In one example embodiment, the events can include permutations of, inter alia: ToF Sensor Event (e.g. a motion sensor event), Product Code Decode Event, Object Detect (ROI-1), Determine Direction, Assign Unique Tracking ID (ROI-2). State machine 500 can determine that items/products have been placed into and/or taken out of the shopping cart without scanning.

Events can be obtained when the tracking engine obtains information from, inter alia: ToF sensor, product code, object detection of unique signatures, direction detection, tracker identifier as device events. These can be provided by on-board sensors in a shopping cart, shopping basket, etc. A ToF Sensor Event can be implemented when a ToF camera senses and/or identifies an item in the shopping container. A Scanner Event can be implemented by a product code scanner device and/or by a digital camera that detects items in the shopping container.

Figure 6:
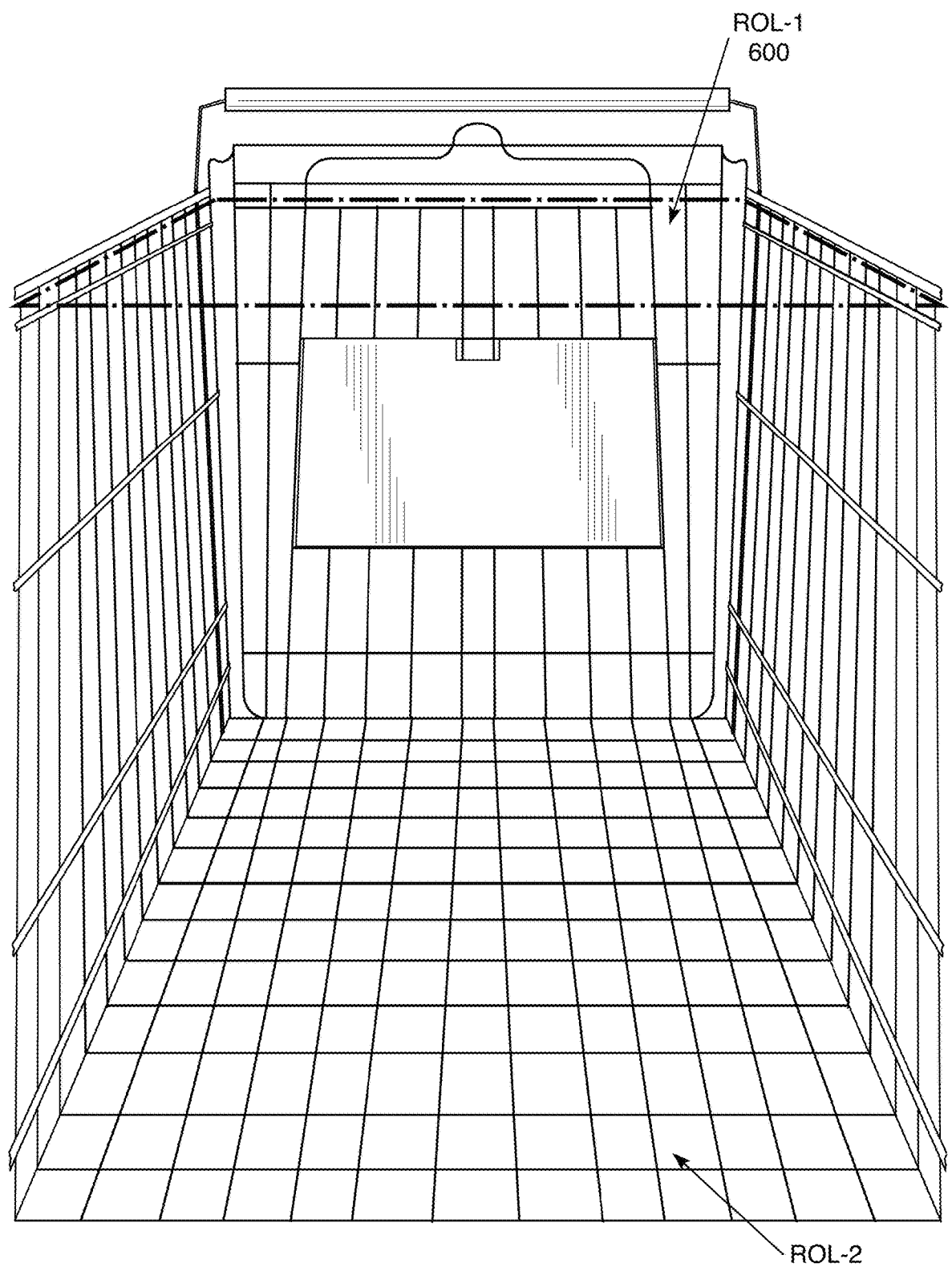
FIG. 6 illustrates an example of ROI1 implemented in a shopping cart, according to some embodiments.

Specified regions of interests can be scanned by multiple digital cameras from different angles and positions to determine if a specified shopping event has occurred therein. FIG. 6 illustrates an example of ROI-1 600 implemented in a shopping cart, according to some embodiments. ROI-1 600 can be threshold at the mouth of the shopping cart. In other examples, the threshold of ROI-1 can be extended or decreased (e.g. a few inches, etc.) for eliminating false positives or false negatives. For example, ROI-1 600 can be defined by a reference plane. A product is being placed into ROI-1 600 as it crosses the reference plane. This can be an object detection (ROI-1) event as used by state machine 500. This object detection method is implemented for each of the video feeds coming from different digital cameras to capture unique signatures such as product code associated with a given shopping item. Then the multistage checkout system compares the accuracy score from each of the object detectors, and uses the frame with highest accuracy score to extract and decode the product code to determine the item's identity.

The determined direction event can be a determination that the product has continued to move down below the mouth of the shopping container. When this is detected, then the determined direction is notified to the multistage checkout system. Then the multistage checkout system uses the determined direction to determine that the shopping item is inside or outside of the shopping container.

The Assign Unique Tracking ID (ROI-2) event is the tracking of the items on the bottom of the shopping cart. ROI-2 can be the bottom of the shopping cart. Once an item/product is dropped on the bottom of the shopping cart, state machine 500 tracks items on the bottom of the shopping cart. These items are assigned a tracking number only when there is no error reported by the ROI-1 detector. Else the multistage checkout system alerts the user that unscanned item has been dropped into the shopping container and it needs to be resolved. The assigned Unique Tracking ID (ROI-2) is used for accounting of the items in the shopping container.

State machine 500 can implement anomaly detection. Anomaly detection can track anomalies associated with items/products in the shopping cart. When an anomaly is detected, the state machine 500 can cause the user's shopping cart to be flagged. In this state, self checkout may not be possible for the user. State machine 500 can flag anomalies like a frequent intervention of users tampering the box position in the cart base. State machine 500 can flag suspicious activity of mix-up depending on the prior location of boxes in the shopping cart base. State machine 500 can detect an anomaly when the user scans an item but swops it with another item (e.g. see anomaly table of FIG. 3 discussed supra).

State machine 500 can track state information for occluded items. For example, state machine 500 can determine that a large item has blocked a digital camera for an extended period of time. State machine 500 can determine that a large item is blocking smaller items that have not been identified. State machine 500 can determine that user gestures are blocking or hiding items. State machine 500 can flag shopping carts where occlusion scenarios are detected.

More specifically, in event state 506, the state machine 500 determines the following values for ToF Sensor Event='Y', Product Code Decode Event='N', Object Detect (ROI-1)='N', Determine Direction='N', Assign Unique Tracking ID (ROI-2)='N'. Then state machine 500 enters a no operation state 514.

In event state 508, the state machine 500 determines the following values for ToF Sensor Event='Y', Product Code Decode Event='Y', Object Detect (ROI-1)='N', Determine Direction='N', Assign Unique Tracking ID (ROI-2)='N'. Then state machine 500 enters a price check state 516.

In event state 510, the state machine 500 determines the following values for ToF Sensor Event='Y', Product Code Decode Event='Y', Object Detect (ROI-1)='Y', Determine Direction='Y', Assign Unique Tracking ID (ROI-2)='N'. Then state machine 500 enters a price check state 516.

In event state 512, the state machine 500 determines the following values for ToF Sensor Event='Y', Product Code Decode Event='Y', Object Detect (ROI-1)='Y', Determine Direction='Y', Assign Unique Tracking ID (ROI-2)='Y'. Then state machine 500 enters a add Item to the shopping cart (virtual) state 518.

In event state 518, the state machine 500 determines the following values for ToF Sensor Event='Y', Product Code Decode Event='Y', Object Detect (ROI-1)='N', Determine Direction='N', Assign Unique Tracking ID (ROI-2)='Y'. Then state machine 500 enters an add item to the shopping cart (e.g. item dropped too fast) state 526.

In event state 520, the state machine 500 determines the following values for ToF Sensor Event='Y', Product Code Decode Event='N', Object Detect (ROI-1)='Y', Determine Direction='Y', Assign Unique Tracking ID (ROI-2)='Y'. Then state machine 500 enters an unknown item in cart state 528 (e.g. "Please scan the item before placing into the cart" message displayed, etc.).

In event state 522, the state machine 500 determines the following values for ToF Sensor Event='Y', Product Code Decode Event='N', Object Detect (ROI-1)='N', Determine Direction='N', Assign Unique Tracking ID (ROI-2)='Y'. Then state machine 500 enters an unknown Item in the cart (e.g. item dropped too fast) state 530.

In event state 524, the state machine 500 determines the following values for ToF Sensor Event='N', Product Code Decode Event='N', Object Detect (ROI-1)='N', Determine Direction='N', Assign Unique Tracking ID (ROI-2)='Y'. Then state machine 500 enters an unknown item in cart (item dropped or entered from side) state 532.

In event state 534, the state machine 500 determines the following values for ToF Sensor Event='Y', Product Code Decode Event='Y', Object Detect (ROI-1)='Y', Determine Direction='Y', Assign Unique Tracking ID (ROI-2)='Y'. Then state machine 500 enters a remove item from the shopping cart state 542.

In event state 536, the state machine 500 determines the following values for ToF Sensor Event='Y', Product Code Decode Event='N', Object Detect (ROI-1)='Y', Determine Direction='N', Assign Unique Tracking ID (ROI-2)='Y'. Then state machine 500 enters a remove item from the shopping cart state 542.

In event state 538, the state machine 500 determines the following values for ToF Sensor Event='Y', Product Code Decode Event='N', Object Detect (ROI-1)='Y', Determine Direction='Y', Assign Unique Tracking ID (ROI-2)='Y'. Then state machine 500 enters an add item from shopping cart (e.g. causes a local speaker system to sound a low beep to indicate user needs to move item) state 546.

In event state 540, the state machine 500 determines the following values for ToF Sensor Event='Y', Product Code Decode Event='Y', Object Detect (ROI-1)='Y', Determine Direction='Y', Assign Unique Tracking ID (ROI-2)='Y'. Then state machine 500 enters an add item from shopping cart (e.g. causes a local speaker system to sound a low beep to indicate user needs to move item) state 546.

In event state 540, the state machine 500 determines the following values for ToF Sensor Event='Y', Product Code Decode Event='Y', Object Detect (ROI-1)='Y', Determine Direction='Y', Assign Unique Tracking ID (ROI-2)='Y'. Then state machine 500 enters an unknown item in cart (e.g. causes a local speaker system to sound a loud beep to indicate user needs to move item) state 548.

In event state 550, the state machine 500 determines the following values for ToF Sensor Event='Y', Product Code Decode Event='Y', Object Detect (ROI-1)='Y', Determine Direction='Y', Assign Unique Tracking ID (ROI-2)='Y'. Then state machine 500 enters an unknown item in cart (e.g. causes a local speaker system to sound a loud beep to indicate user needs to move item and that self-checkout has failed) state 558.

In event state 552, the state machine 500 determines that the items are ready for checkout. Then state machine 500 enters a reconcile with cloud-computing platform version 560.

In event state 554, the state machine 500 determines that a stop session state has been achieved. Then state machine 500 enters an error state (e.g. a message such as—'Please see Store Associate or go through cashier checkout station', etc. can be displayed) state 560.

In event state 556, the state machine 500 determines that a stop session state has been achieved. Then state machine 500 enters a no error state (e.g. a message such as—'Thank You', etc. can be displayed) state 564.

In step 566, state machine 500 can enter a reconcile state.

Figure 7A:
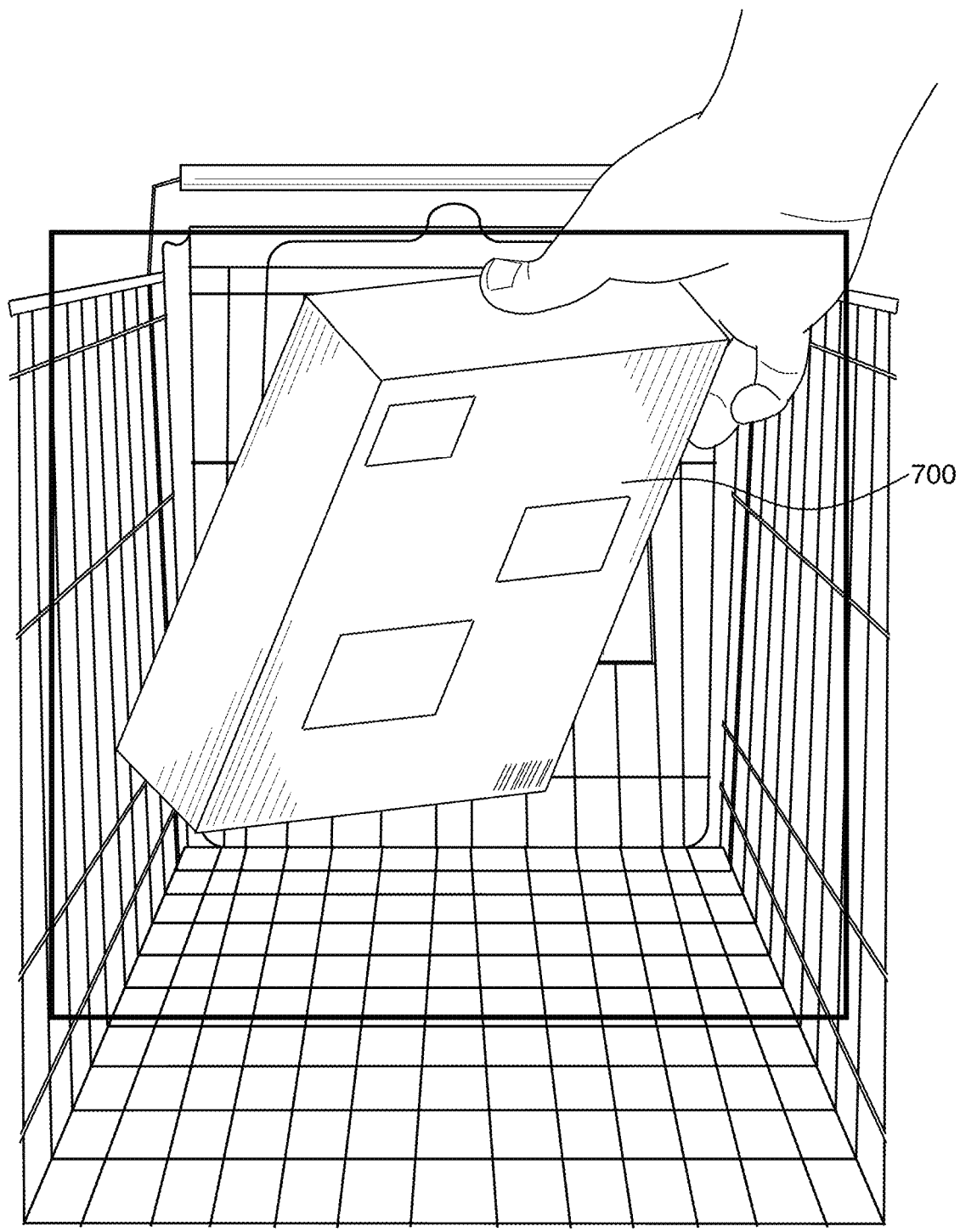
FIGS. 7 A-C illustrates screenshots of a set of example events that can be detected by a state machine, and with respect to ROI2 according to some embodiments.

FIGS. 7 A-C illustrates screenshots of a set of example events that can be detected by a state machine, according to some embodiments. More specifically, FIG. 7A shows a screenshot of example barcode reading event 700, according to some embodiments. The user can hold the item in a position for a product code reader or a digital camera to read the product code (and/or other type of matrix code) associated with the shopping item. The item can then be passed through ROI-1 600 at the mouth of the shopping container. This is registered as an "Object Detect" event. Once the object detection method is complete, the product code is isolated and decoded into a string for identifying the item. This is registered as a "Product Code Decode" event. Then as the item passes through the threshold values of ROI-1 600 as it is being placed into or out of the shopping cart it is registered as a "Determined Direction" event. Once the item hits the base of the shopping container, the ROI-2 detector assigns a unique tracking id, and this is registered as an "Assign Unique Tracking Id" event. In one example, the detection of these events can cause state machine 500 to determine the state 518 of the item in the shopping container.

Figure 7B:
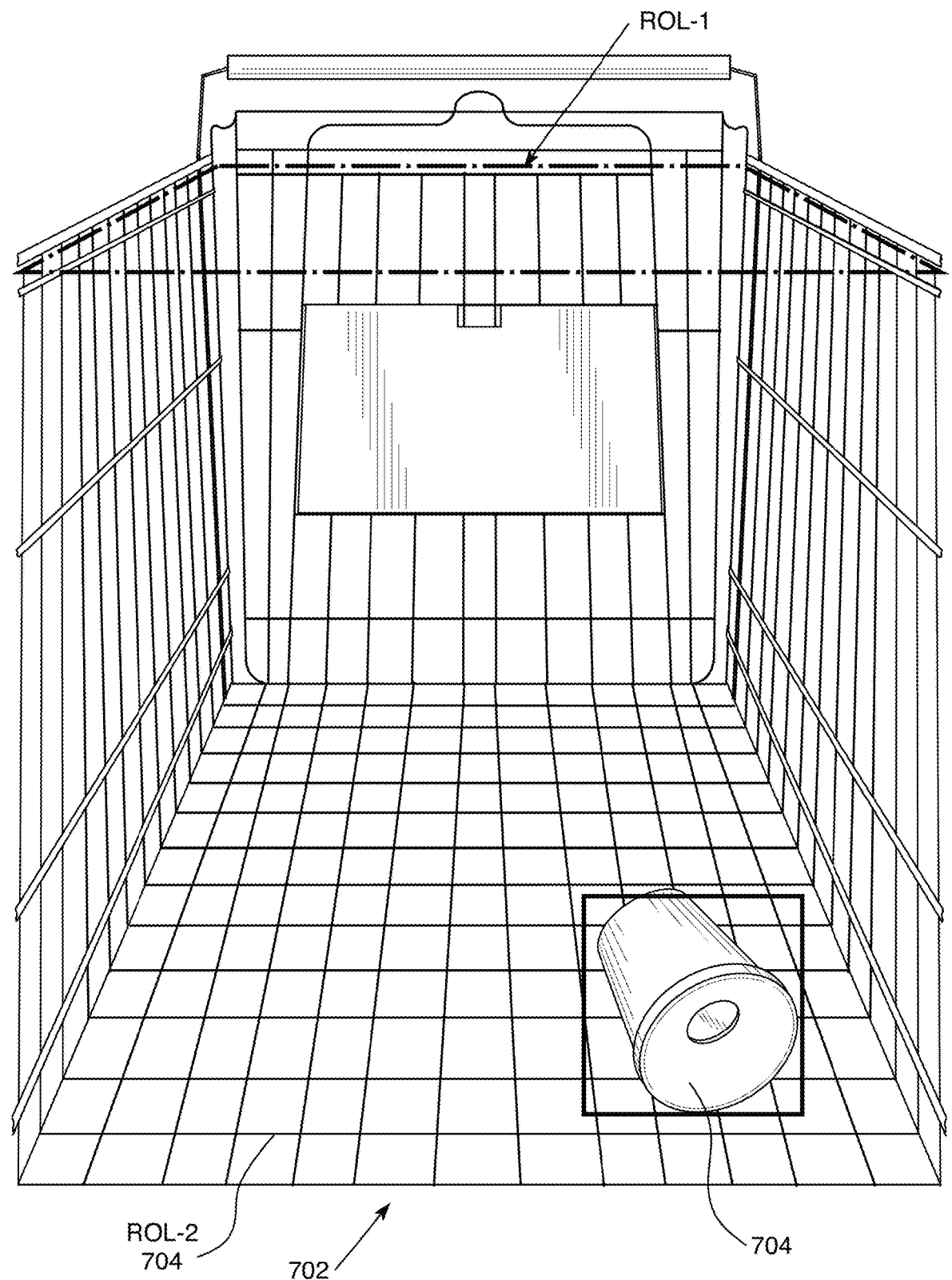

FIG. 7B illustrates an example screenshot 702 of item 706 sitting in ROI-2 704, according to some embodiments. ROI-2 704 can be defined as the bottom of the shopping cart. State machine 706 can have caused item 706 to have an ID. The ID can be persistent while item 706 is detected as remaining in ROI-2 704 even when item 706 is occluded by other items. Item 706 is also shown with a bounding box. An object detection algorithm can use a bounding box to describe the target location of item 706. The numbers on the bounding boxes are tracking numbers that can be used as a tracking ID. Once a bounding box lands on ROI-2 704, it is assigned a unique tracking ID. The tracking ID's of items in the shopping cart can be maintained in a list. When it is detected that a tracking ID is removed from the shopping cart, the item can be removed from the list. The list can be used to facilitate an automated check out process(es).

Figure 7C:
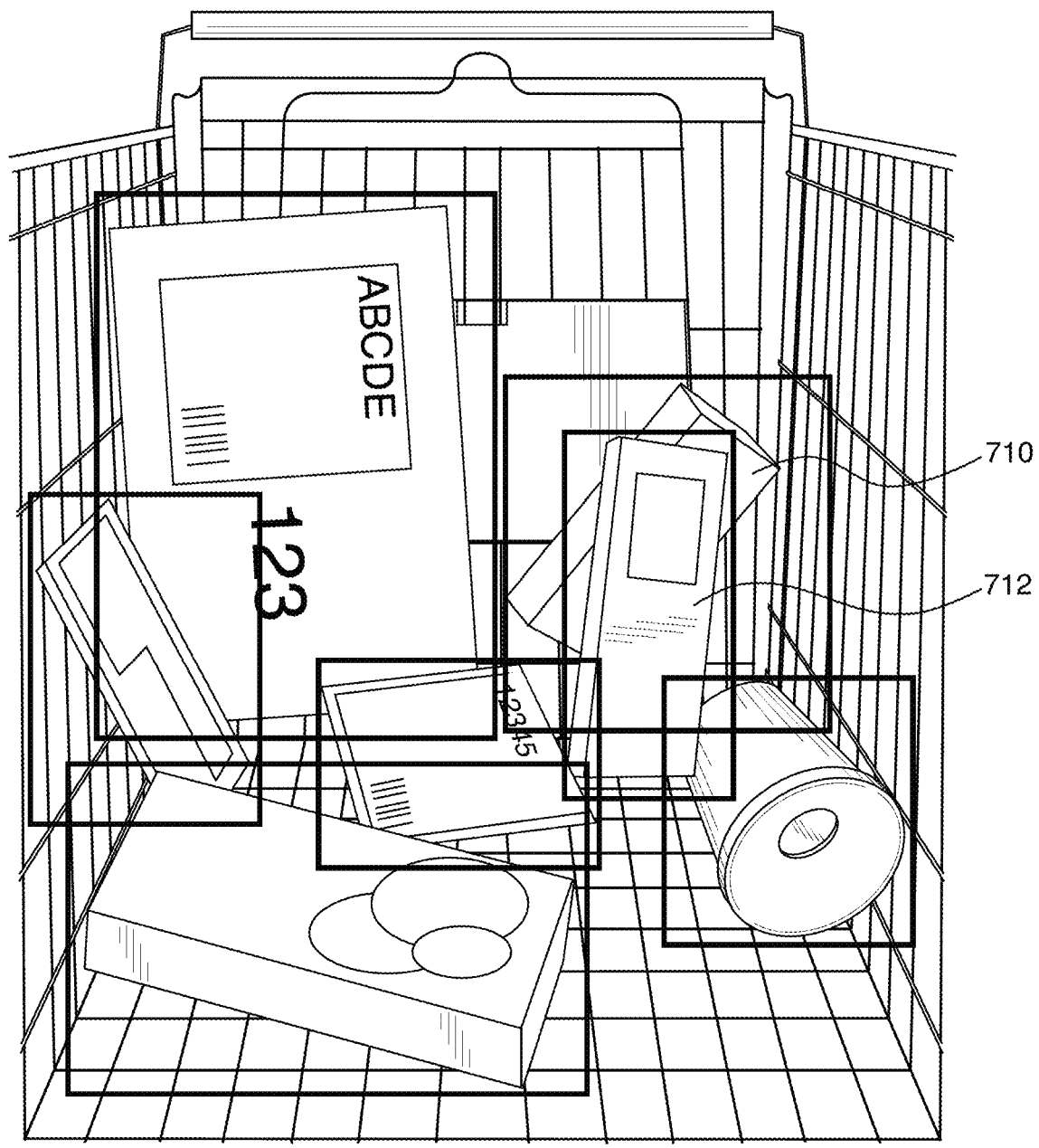

FIG. 7C illustrates an example screenshot with multiple items in a shopping cart, according to some embodiments. As shown, an occluded item 710 is persistently maintained in the state of being in the shopping cart, even as it is occluded by occluding item 712. The bounding box can be used to track an item that is occluded.

Figure 8A:
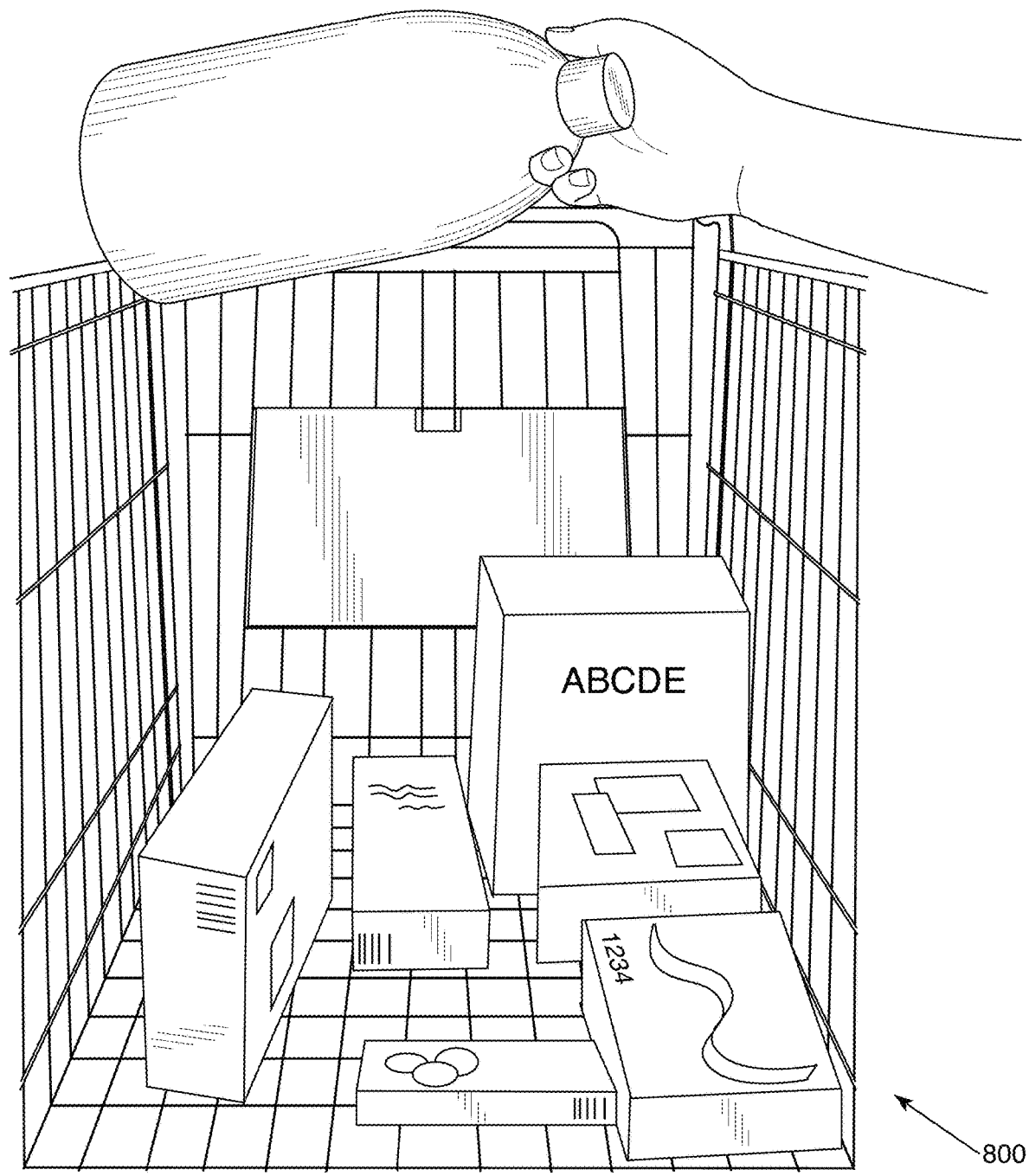
FIGS. 8 A-B illustrate example screenshots illustrating an implementation of a computer vision algorithm on a set of items in a shopping cart, according to some embodiments.
Figure 8B:
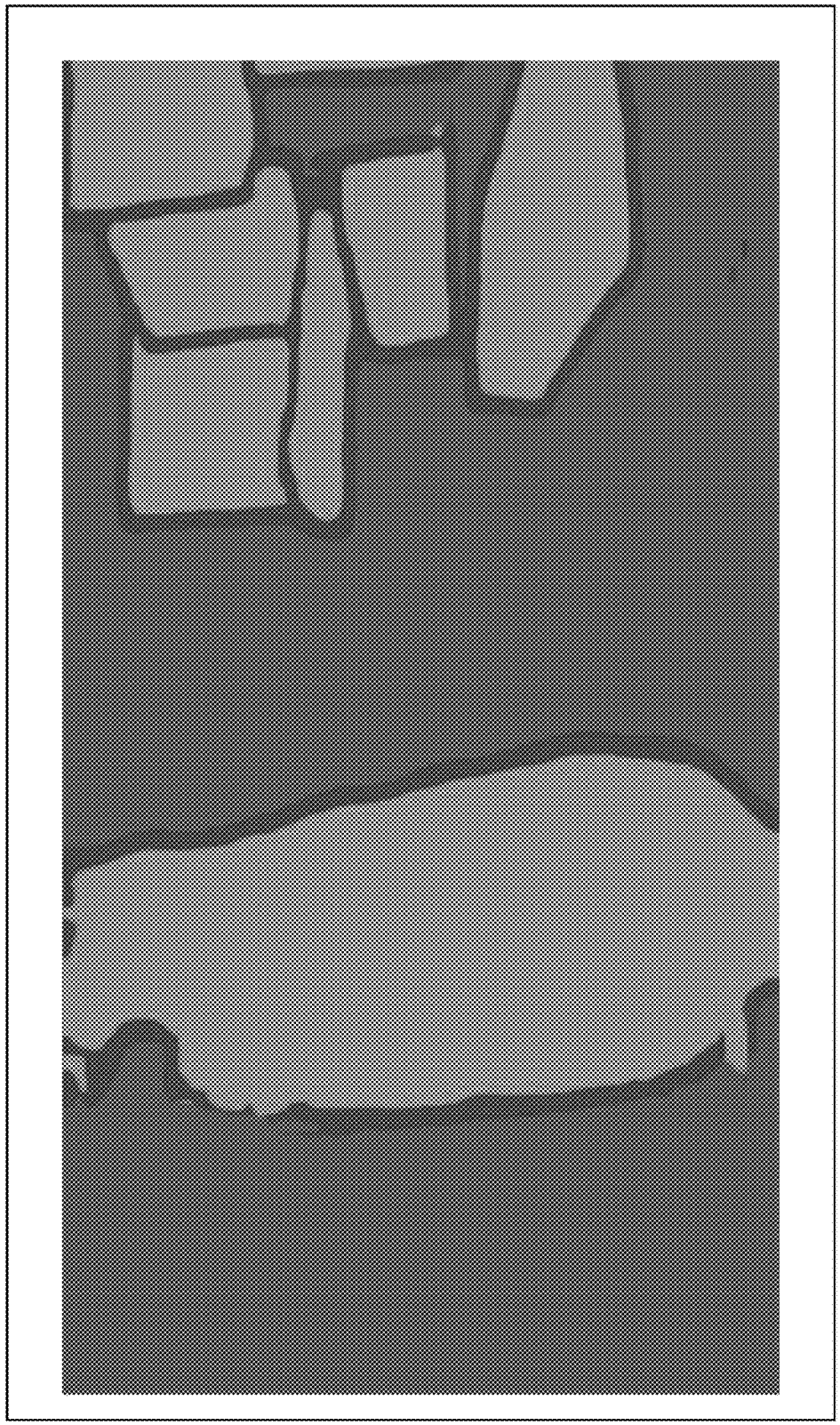

FIGS. 8 A-B illustrate example screenshots 800 and 802 illustrating an implementation of a computer vision algorithm on a set of items in a shopping container, according to some embodiments. FIG. 8A illustrates an example screenshot 800 of a set of items in a shopping cart. Various object detection algorithms can be implemented on the set of items. For example, a semantic segmentation algorithm can be implemented. Semantic segmentation can identify each item that is present in the digital image and the location of each item (e.g. by locating all the pixels that belong to each item, etc.). FIG. 8B illustrates a screenshot of an example set of images 802 illustrates results of a semantic segmentation algorithm implemented on the set of items, according to some embodiments.

It is noted that the examples of FIGS. 6-8AB are provided by way of example. Various computer systems (e.g. Smart-phones, Personal Shopping Assistant (PSA) devices, Data Terminals, Mobile Devices, etc.) with digital cameras and a computer network system can be utilized. These can be placed in various positions in a shopping cart to obtain the information used to implement state machine 500. It is noted that other types of carrier systems other than shopping carts can be used as well. These can include, inter alia: shopping baskets, shopping bags, boxes, etc. Accordingly, the placement of the computer system can be modified to accommodate the dimensions of each type of carrier system.

Additional Example Computer Architecture and Systems

Figure 9:
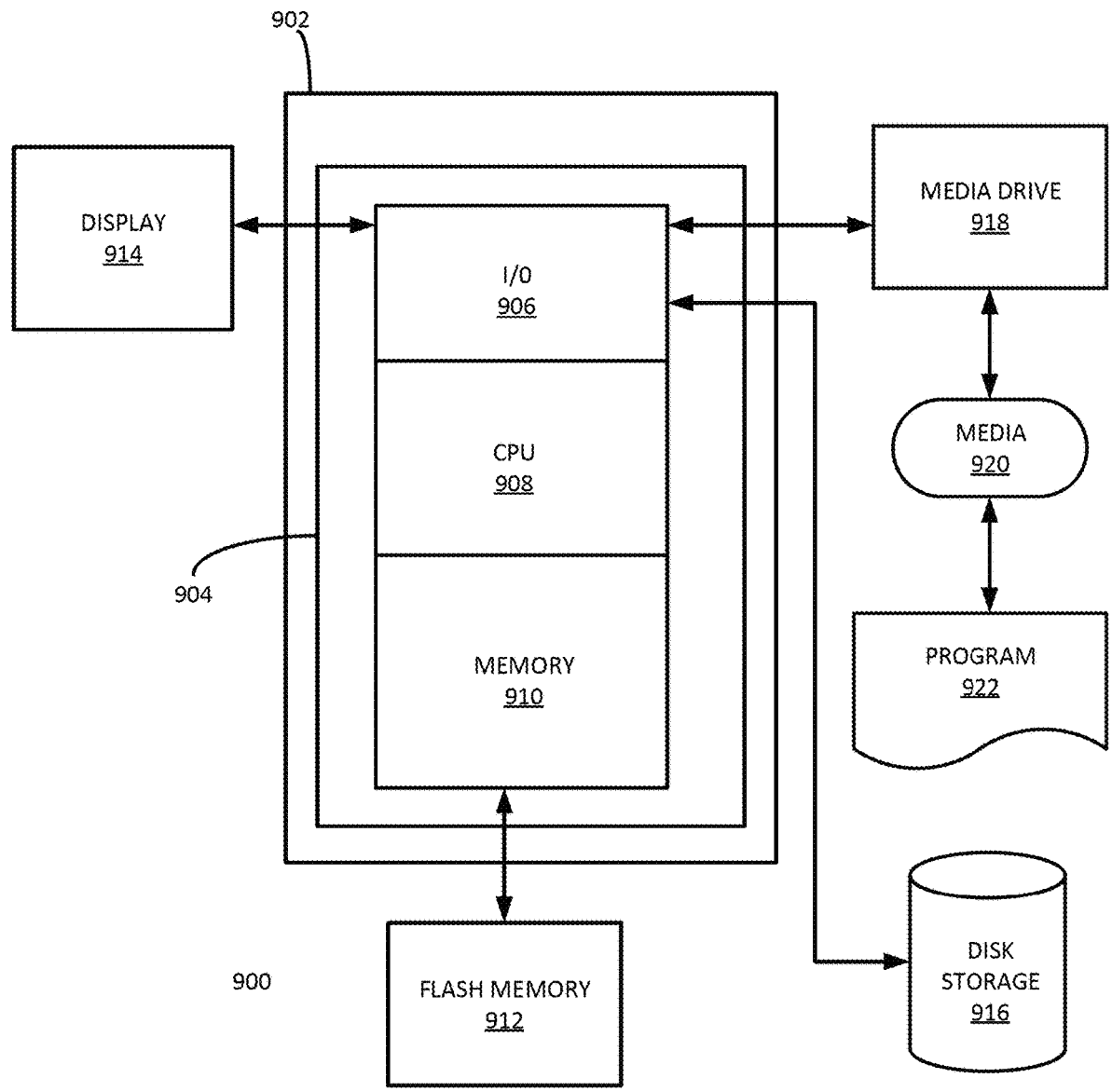
FIG. 9 is a block diagram of a sample computing environment that can be utilized to implement various embodiments.

FIG. 9 depicts an exemplary computing system 900 that can be configured to perform any one of the processes provided herein. In this context, computing system 900 may include, for example, a processor, memory, storage, and I/O devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts computing system 900 with a number of components that may be used to perform any of the processes described herein. The main system 902 includes a motherboard 904 having an I/O section 906, one or more central processing units (CPU) 908, and a memory section 910, which may have a flash memory card 912 related to it. The I/O section 906 can be connected to a display 914, a keyboard and/or other user input (not shown), a disk storage unit 916, and a media drive unit 918. The media drive unit 918 can read/write a computer-readable medium 920, which can contain programs 922 and/or data. Computing system 900 can include a web browser. Moreover, it is noted that computing system 900 can be configured to include additional systems in order to fulfill various functionalities. Computing system 900 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A system for multistage object detection and tracking for a cashierless checkout comprising:
    a mobile device comprising:
        a set of on-board sensors installed in the shopping container, wherein the on-board sensors comprise digital cameras viewing an interior of the shopping container from a set of different angles and positions, wherein the on-board sensors detect and provide a user activity data associated with respect to placement or removal of a set of shopping items into or from a shopping container, and wherein a digital camera obtains a set of video frames associated with these items entering and leaving the interior region of the shopping container and communicates these to a mobile device comprising an on-device machine learning (ML) detection;
        an on-device ML detection and tracking engine, wherein the on-device ML detection and tracking engine uses computer vision and specified ML algorithms to implement object detection of unique signatures associated with a shopping item of the set of shopping items and tracking the shopping item by interfacing with the set of on-board image sensors in the interior of the shopping container and determines a state of the item in the interior region of the shopping container;
        wherein the on-device ML detection and tracking engine detects the item in the interior of the shopping cart and determines the state of the item in the interior region of the shopping container based in two phases of analysis comprising:
            in a first phase, the on-device ML detection and tracking engine scans the set of video frames from different digital cameras of the interior region of the shopping container for a semantic change from a previous frame,
            in a second phase, the on-device ML detection and tracking engine implements an object detection process on the interior region, such that a presence or an absence of the item is detected;
        wherein the on-device ML detection and tracking engine comprising:
            detects an anomaly scenario; and
            flags the shopping container when the anomaly scenario is detected wherein the anomaly scenario comprises an occlusion scenario;
        wherein the occlusion scenario comprises a blocking of the view of the digital camera with a larger item,
        wherein the on-device ML detection and tracking engine persistently maintains the state of an occluded item in the shopping container, even as the occluded item is completely occluded,
        wherein the on-device ML detection and tracking engine utilizes a bounding box to track the occluded item and provide the occluded item with an identifier that is persistent while wherein the occluded item is detected as remaining in ROI-2,
        wherein an object detection algorithm uses the bounding box to describe a target location of occluded item,
        wherein when the bounding box lands in ROI-2, the tracking identifier is assigned and maintained in a list until the occluded item is later detected by the object detection algorithm and the tracking ID is removed from the shopping cart,
        wherein the shopping container is divided into multiple regions of interest (ROI) comprises a first ROI, a second ROI, and a third ROI,
        wherein the first ROI is defined across a top length and breadth of the shopping container,
        wherein the first ROI comprises a primary area of interest used to ascertain the unique signatures associated with a shopping item,
        wherein the first ROI comprises a primary area of interest used to ascertain a movement direction of shopping items, and
        wherein the second ROI is defined at the base of the shopping container.

2. The system of claim 1, wherein the shopping container is associated with a shopping cart or a shopping basket.

3. The system of claim 2, wherein the on-device ML detection and tracking engine tracks the item that gets placed into the ROI at the bottom of the shopping container.

4. The system of claim 3, wherein the third ROI is defined at the handlebar of the shopping container to detect if items is placed.

5. The method of claim 1, wherein a change in the item count is detected in the second ROI without a corresponding event detected in the first ROI, the on-device ML detection and tracking engine flags the user that an unscanned item has been detected in the shopping container and that this state has to be rectified by a user action.

6. The method of claim 1, wherein the on-device ML detection and tracking engine offloads to a set of subsequent stages running in remote servers receiving continuous streams of data and video from the first stage for further processing.

7. The method of claim 1, wherein the on-device ML detection and tracking engine uses a second stage, wherein the second stage executes a different set of ML detection and tracking algorithms for improved accuracy and error reduction.

8. The method of claim 1, wherein in the third stage the on-device ML detection and tracking engine uses a correlation engine to validate and ratify events from previous stages to make a go/no-go decision.

9. The method of claim 1, wherein multiple stages are used to determine the state of the item is ready for a checkout process based on the detected presence of the item in the shopping container.

10. The method of claim 1, wherein multiple stages are used to determine the state of the item is not ready for a checkout process based on the detected presence of the item in the shopping container.

11. The method of claim 1, wherein the first stage and the second stage can be repeated until a reliable checkout process is established.

12. The method of claim 1, wherein the subsequent stages are used for improved accuracy, reduce errors, and catch anomalies from previous stages for delivering a robust cashierless checkout process.

* * * * *